United States Patent
Schmidt et al.

(10) Patent No.: US 12,442,100 B2
(45) Date of Patent: Oct. 14, 2025

(54) PISTON RING WITH HARD CHROMIUM LAYER AND IMPROVED RUNNING-IN BEHAVIOUR

(71) Applicant: Federal-Mogul Burscheid GmbH, Burscheid (DE)

(72) Inventors: Peter Schmidt, Burscheid (DE); Sabine Balke, Burscheid (DE); Stefan Lueer, Langenfeld (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 372 days.

(21) Appl. No.: 17/904,831

(22) PCT Filed: Feb. 17, 2021

(86) PCT No.: PCT/EP2021/053826
§ 371 (c)(1),
(2) Date: Aug. 23, 2022

(87) PCT Pub. No.: WO2021/170460
PCT Pub. Date: Sep. 2, 2021

(65) Prior Publication Data
US 2023/0147997 A1    May 11, 2023

(30) Foreign Application Priority Data
Feb. 26, 2020   (DE) .............. 10 2020 105 003.8

(51) Int. Cl.
*C25D 7/04*        (2006.01)
*C25D 3/04*        (2006.01)
(Continued)

(52) U.S. Cl.
CPC .............. *C25D 7/04* (2013.01); *C25D 3/04* (2013.01); *C25D 5/12* (2013.01); *C25D 5/48* (2013.01); *C25D 5/625* (2020.08); *F16J 9/26* (2013.01)

(58) Field of Classification Search
None
See application file for complete search history.

(56) References Cited

U.S. PATENT DOCUMENTS

| | | | |
|---|---|---|---|
| 6,503,642 B1 | 1/2003 | Linde | |
| 2002/0060159 A1* | 5/2002 | Shimizu | C25D 7/10 205/104 |

FOREIGN PATENT DOCUMENTS

| | | |
|---|---|---|
| CH | 482110 A | 11/1969 |
| CN | 101498256 A | 5/2009 |

(Continued)

OTHER PUBLICATIONS

European Patent Office; International Search Report; May 12, 2020; entire document.

*Primary Examiner* — Daniel J. Schleis
(74) *Attorney, Agent, or Firm* — Dickinson Wright PLLC

(57) ABSTRACT

A piston ring includes a base body having an inner circumferential surface, first and second flank surfaces and an outer circumferential surface, wherein a first hard chromium layer with a crack network is applied to the outer circumferential surface and has a crack density of 10-250 cracks per mm and solid particles having an average particle size of 0.01-10 μm embedded in cracks of the first hard chromium layer, a second hard chromium layer having a crack network applied to the first hard chromium layer and having a crack density of the crack network of 10-250 cracks per mm, no solid particles being embedded in the cracks thereof, where the cracks have an average width of 1-15 μm, the cracks are (Continued)

electrolytically expanded and the surface proportion of the cracks are 3-25% based on a total surface of the second hard chromium layer.

16 Claims, 1 Drawing Sheet

(51) Int. Cl.
*C25D 5/00* (2006.01)
*C25D 5/12* (2006.01)
*C25D 5/48* (2006.01)
*F16J 9/26* (2006.01)

(56) References Cited

FOREIGN PATENT DOCUMENTS

| | | |
|---|---|---|
| DE | 19752720 A1 | 6/1999 |
| DE | 202009009206 U1 | 9/2009 |
| EP | 0909839 * | 4/1999 |
| EP | 0909839 A1 | 4/1999 |

* cited by examiner

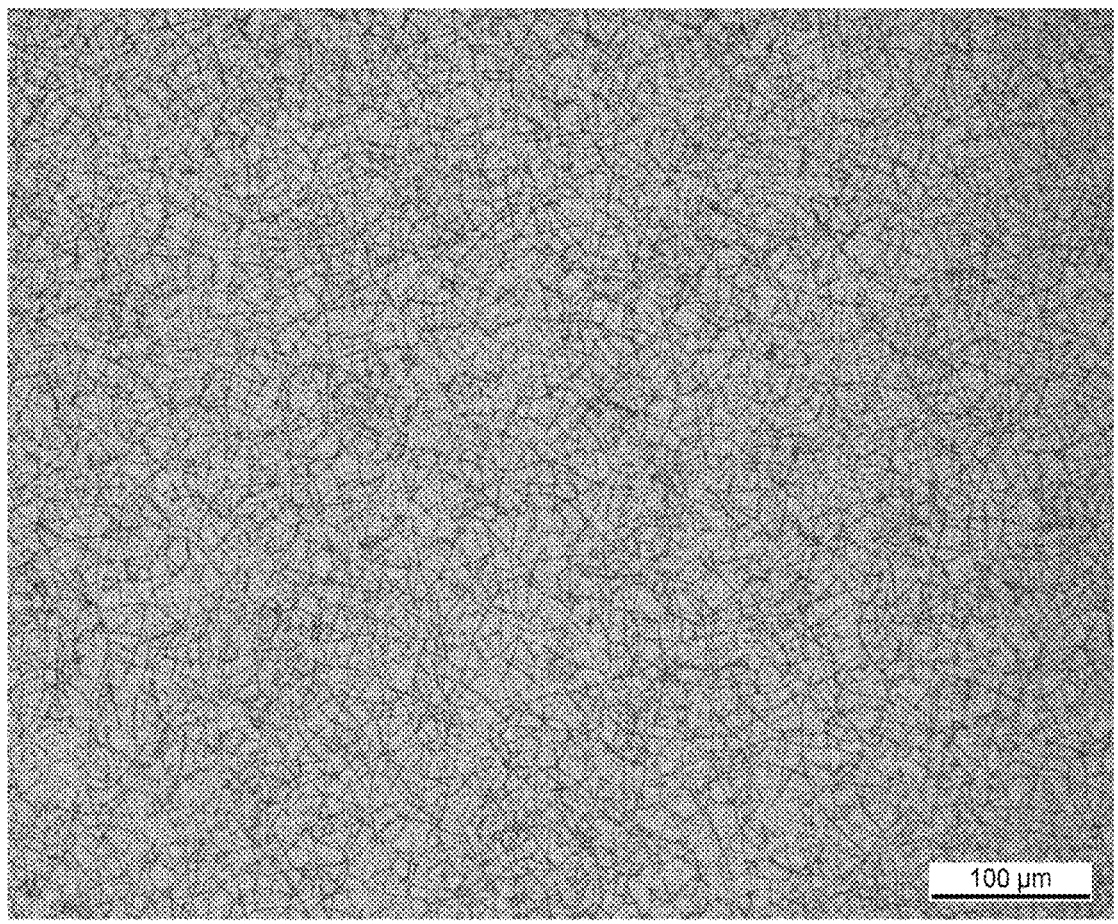

PISTON RING WITH HARD CHROMIUM LAYER AND IMPROVED RUNNING-IN BEHAVIOUR

BACKGROUND OF THE INVENTION

The invention relates to a piston ring with a hard chromium layer on the running surface and improved running-in behaviour, as well as to a method for producing such a piston ring and its use in an internal combustion engine.

Piston rings for internal combustion engines are exposed to high friction and high temperatures and must therefore have surfaces that are highly resistant to wear and seizure as well as being fire resistant and also have good sliding properties. For this purpose, the outer circumferential surfaces (running surfaces) of the piston rings are usually provided with wear protection coatings, for example in the form of electrolytically deposited hard chromium layers.

Solid particles can be embedded in galvanic hard chromium layers to improve wear and seizure resistance. DE 3531410 A1 and EP 0217126 A1 describe galvanic hard chromium layers which have a crack network and in whose cracks solid particles are embedded.

However, the wear resistance of such hard chromium solid particle layers is so high that the running-in of the piston rings takes a very long time, usually 2000 operating hours or more. During this time, the internal combustion engine is prone to failure and shows high oil consumption. This is particularly important in the case of large piston rings, such as those used in marine engines. Large piston rings are generally referred to when the piston rings have a diameter of approx. 120-1000 mm.

SUMMARY OF THE INVENTION

According to the invention, this object is solved by a piston ring having a base body, wherein the base body has an inner circumferential surface, a first flank surface, a second flank surface and an outer circumferential surface, wherein a first hard chromium layer with a crack network is applied to the outer circumferential surface, wherein the crack network of the first hard chromium layer having a crack density of 10-250 cracks per mm, and solid particles, having an average particle size of 0.01-10 µm, being embedded in the cracks of the first hard chromium layer, a second hard chromium layer with a crack network is applied to the first hard chromium layer, wherein the crack density of the crack network of the second hard chromium layer is 10-250 cracks per mm and no solid particles are embedded in the cracks of the second hard chromium layer, the cracks on the surface of the second hard chromium layer have an average width of 1-15 µm, the cracks on the surface of the second hard chromium layer are electrolytically expanded and the surface proportion of the cracks on the surface of the second hard chromium layer is 3-25%, based on the total surface of the second hard chromium layer.

The problem is further solved by a method of manufacturing a piston ring, comprising the steps that
- a piston ring having a base body comprising an inner circumferential surface, a first flank surface, a second flank surface and an outer circumferential surface is placed in an electrolyte containing a chromium compound and solid particles having an average particle size of 0.01-10 µm,
- a first hard chromium layer, which has a crack network, is electrolytically deposited on the outer circumferential surface,
- the direction of electric current is reversed, wherein cracks that have formed widen and the solid particles are deposited in the cracks,
- steps (b) and (c) are repeated at least once so that a first hard chromium layer is formed which contains solid particles in the cracks,
- the piston ring is placed in an electrolyte containing a chromium compound and no solid particles, and a second hard chromium layer comprising a crack network is electrolytically deposited on the first hard chromium layer, and
- the direction of electric current is reversed, wherein the cracks formed on the surface of the second hard chromium layer widen to an average width of 1-15 µm and the surface proportion of the cracks is 3-25%, based on the entire surface of the second hard chromium layer.

The piston ring described above has the advantage of having cracks on the surface which are widened and thus constitute a high surface area, so that they can act as a lubricant reservoir. At the same time, the piston ring according to the invention has a particle-free hard chromium layer on the surface, which is not as wear-resistant as the first hard chromium layer with solid particles (hard chromium-solid particle layer), as a result of which the running-in behaviour is shortened overall and thus significantly improved. In particular, this reduces oil consumption in the first approximately 2000 hours of operation. In addition, the upper particle-free layer is a hard chromium layer that has proven particularly suitable for piston rings. The upper particle-free hard chromium layer wears off during the running-in phase, so that after the running-in of the piston ring the known, advantageous hard chromium solid particle layer, i.e. the first hard chromium layer can take over its task as friction partner in the internal combustion engine. Steps (e) and (f) may be repeated if necessary, possibly more than once. In this way, the thickness of the particle-free hard chromium layer can be adapted to the requirements.

The basic structure of a piston ring with inner and outer circumferential surfaces and flank surfaces is described, for example, in DE 10 2011 084 052 A1.

In the sense of the invention, a hard chromium layer is understood to be an electrolytically (galvanically) applied chromium layer. To form the hard chromium layer, the piston ring is placed in an electrolyte and cathodically operated. The formation of the hard chromium layer, with or without solid particles, is known and is described, for example, in EP 2 825 682 A1 and EP 2 260 127 A1.

A continuous current or a pulsating continuous current is applied to the piston ring. In the deposition step (b), the hard chromium layer is formed with a crack network (microcrack network). Since solid particles are to be deposited in the crack network, the electrolyte contains solid particles and in the polarity reversal step (c), the piston ring is anodically operated and the cracks widen so that the solid particles are deposited in the widened microcracks. The solid particles are preferentially held in suspension in the electrolyte. When steps (b) and (c) are repeated, the cracks are closed in the subsequent deposition step (b) and a further layer of a microcracked hard chromium layer is deposited, which again has new cracks and the cracks of which can subsequently be widened and filled with particles.

Each chromium layer (chromium deposit) preferably has a thickness of about 6-20 µm, and by reversing the direction of the electric current (polarity reversal) and depositing several times, the thickness of the first hard chromium layer can be adapted to the desired application.

Following the deposition of the first hard chromium layer, a second hard chromium layer is then deposited in step (e), which does not contain any solid particles. At the end of the deposition, in step (f), the polarity is reversed again (the direction of the current is reversed) and the cracks on the surface are widened so that they have the specified average width and account for a correspondingly high proportion of the surface.

The average width of the cracks (crack width) at the surface of the second hard chromium layer is determined by measuring the width of at least ten randomly selected cracks in the surface by measuring approximately perpendicular to the crack path and determining the arithmetic mean value of these at least ten measured crack widths. Microscopic images of the surface are used for measuring, in particular microscopic images of running surface polishes, which can be produced as described in the example below.

The average width of the cracks on the surface of the second hard chromium layer is 1-15 µm, preferably 1.5-12 µm, more preferably 2-10 µm and most preferably 3-9 µm.

The surface portion of the cracks in or on the surface of the second hard chromium layer is also determined from microscopic images of the surface, in particular microscopic images of tread sections of the surface. The cracks differ from the rest of the hard chromium layer in coloration, with the cracks having a darker coloration, as shown in FIG. 1. To determine the surface area of the cracks, an area of at least 40 µm×40 µm is taken, and the proportion of dark coloration, i.e. the proportion of the cracks on the surface relative to the total area is determined by measuring. This is determined on at least three randomly selected squares of at least 40 µm×40 µm, and the arithmetic mean is determined from these three measurements. The value thus determined is the surface proportion of the cracks in the surface of the second hard chromium layer.

The surface proportion of the cracks in the surface of the second hard chromium layer is 3-25%, preferably 5-20%, more preferably 6-18%, in each case based on the entire surface of the second hard chromium layer.

In a preferred embodiment, the chromium compound in the electrolyte for depositing the hard chromium layer is a Cr(III) compound or a Cr(VI) compound, in particular a Cr(VI) compound. Preferably, the electrolyte comprises a chromium compound, in particular a Cr(VI) compound in an amount corresponding to 100-400 g/l, in particular 150-300 g/l chromic acid anhydride. It is further preferred that the electrolyte comprises 1-26 g/l, in particular 2-25 g/l of one or more acid(s), for example sulfuric acid and/or aliphatic sulfonic acid. Preferably, an aliphatic sulfonic acid having 1-6 carbon atoms is present in the electrolyte, in particular in an amount of 1-18 g/l. Particularly preferred are aliphatic sulfonic acids having 1-4 carbon atoms and among these methane sulfonic acid, ethane sulfonic acid, methane disulfonic acid and/or ethane disulfonic acid are particularly preferred. Most preferred is methane sulfonic acid. The electrolyte may further comprise the usual electrolytic aids and catalysts which aid chromium deposition. These may be present in the usual amounts in the electrolyte. The amounts of the individual components in the electrolyte disclosed above refer to the electrolyte as a whole. In order to chromium plate cast iron, the electrolyte may further contain fluorides, for example potassium fluoride or potassium hexafluorosilicate.

The current density in the deposition steps (b) and (e) is in each case preferably 10-200 A/dm$^2$, particularly preferably 20-100 A/dm$^2$ and most preferably 40-80 A/dm$^2$. The temperature during the electrolytic deposition (galvanic deposition) can be 20-95° C., preferably 40-80° C. The current density in the polarity reversal steps (c) and (f) is in each case preferably also 10-200 A/dm$^2$, particularly preferably 20-100 A/dm$^2$ and most preferably 40-80 A/dm$^2$.

The duration of the reversal step (c) is preferably 30-240 s, more preferably 45-120 s. The duration of the expansion of the cracks in step (f) is preferably 60-300 s, particularly preferably 120-240 s.

The time duration of the deposition steps (b) and (e) is selected as a function of the desired thickness of the respective hard chromium layer, wherein the layer becomes thicker the higher the current density and the current yield as well as the deposition time are. In the sense of the invention, a hard chromium layer is understood to be an electrodeposited chromium layer.

In order to achieve a uniform distribution of the solid particles in the first hard chromium layer, steps (b) and (c) are repeated, wherein 1-50 repetitions, in particular 10-30 repetitions, have proven to be favorable. Preferably, the first hard chromium layer has a layer thickness of about 50-300 µm. Layer thicknesses of 60-200 µm, in particular 80-180 µm, are preferred.

Since the first hard chromium layer contains solid particles, this layer is also referred to as the hard chromium solid particle layer in the context of the present invention. The base body of the piston ring is preferably made of metal or a metal alloy, on which the first hard chromium layer is directly deposited. It is also possible to first apply a further metal layer to the base body as a primer before depositing the first hard chromium layer. In a preferred embodiment, the base body of the piston ring comprises chromium steel containing more than 10 weight percent (wt.-%) chromium.

The layer thickness of the particle-free hard chromium layer, i.e. the second hard chromium layer, is preferably 5-150 µm, particularly preferably 10-50 µm. Preferably, the second hard chromium layer is applied directly to the first hard chromium layer. This means that, in this preferred embodiment, there is no further layer between the first hard chromium layer and the second hard chromium layer. If necessary, a run-in layer can be applied to the outside of the second hard chromium layer, for example a PVD layer or CVD layer.

In order to achieve a high wear resistance of the first hard chromium layer, hard material particles are preferably used as solid particles. In the sense of the invention, hard material particles are understood to be particles of materials having a Mohs hardness of 9 or higher. Among these, hard material particles having a Mohs hardness of 9.2-10 are preferred and those having a Mohs hardness of 9.4-10 are particularly preferred. The Mohs hardness is determined according to the Mohs hardness test known in the prior art. Particularly preferred hard particles are those made of diamond, tungsten carbide, chromium carbide, aluminum oxide, silicon carbide, silicon nitride, boron carbide and/or cubic boron nitride.

The amount of solid particles contained in the electrolyte in the process according to the invention can be varied over a wide range. It has been found to be advantageous for the electrolyte to contain 0.1-200 g/l of solid particles, in particular 1-100 g/l.

A crack network in the sense of the invention is a known crack network which forms during the electrolytic deposition of chromium. In this process, cracks form randomly at certain intervals in the chromium layer, which are filled with chromium during the subsequent deposition. The cracks run through the entire electrolytically deposited hard chromium layer in all directions.

The crack density of the first hard chromium layer and the second hard chromium layer is in each case 10-250 per mm, particularly preferably 20-220 per mm, further preferably 30-200 per mm and most preferably 40-180 per mm. To determine this, at least two cutting lines of at least 1 mm in length are placed in different directions over a microscopic image of a tread section, the crack density is determined by counting and the arithmetic mean is formed from these at least two counts. An example of an image of a suitable tread section is shown in FIG. 1.

By expanding the cracks in step (f), the cracks take up a significantly higher surface proportion than without expanding the cracks and the cracks can be filled with lubricant, in particular oil, and thus ensure better sliding properties of the piston ring according to the invention and also improved emergency running properties in the event of any deficient lubrication occurring. The cracks on the surface of the second hard chromium layer are no longer filled with chromium due to the electrolytic (galvanic) expansion, i.e. they are open. A surface proportion of 5-20% has proved to be particularly favourable, especially 6-18%.

The average particle size (grain size) of the solid particles is 0.01-10 μm, preferably 0.1-3 μm, particularly preferably 0.2-2 μm, especially 0.2-1 μm. The average particle size ($d_{50}$) is determined by laser diffraction in a dry disperser (device: Malvern Mastersizer with Scirocco dispersion unit). The average particle size ($d_{50}$) is the value at which 50% by volume have a smaller particle size and 50% by volume have a larger particle size than the specified value.

The proportion of solid particles, relative to the total volume of the first hard chromium layer, is preferably 0.1-20% by volume, particularly preferably 0.2-10% by volume, especially 0.3-5% by volume. The solid particles are preferably selected from the group consisting of diamond, tungsten carbide, chromium carbide, alumina, silicon carbide, silicon nitride, boron carbide and cubic boron nitride.

The invention also relates to the use of the piston ring according to the invention in an internal combustion engine. For this purpose, the piston ring according to the invention is inserted into the piston of an internal combustion engine in a manner known to the skilled person. A preferred use is the use in marine diesel engines. There, large piston rings having a diameter of 120-1000 mm (millimeters) are preferably used.

It will be understood that the foregoing features, and those to be explained below, may be used not only in the combinations indicated, but also in other combinations or alone, without departing from the scope of the present invention.

FIG. 1 is a microscopic image of a tread section of a hard chromium layer according to the invention with expanded cracks on the surface.

DETAILED DESCRIPTION OF THE PREFERRED EMBODIMENTS

The invention will be explained in more detail in the following example, but without limiting the invention thereto.

Example

A chromium electrolyte with the following composition is prepared:
  250 g/l $CrO_3$ (chromic acid)
  3.0 g/l $H_2SO_4$ (sulphuric acid)
  4.2 ml/l methane sulfonic acid In this chromium electrolyte at 60° C., 50 g/l of monocrystalline diamond particles with an average particle size of 0.2 to 0.4 μm are dispersed by stirring, kept in suspension during chromium plating and a chromium steel piston ring is introduced into the electrolyte. The piston ring to be chromium-plated is first cathodically operated in a first step and chromium-plated for 10 minutes at a current density of 60 A/dm³. In a second step, the polarity is reversed and, by anodically operating the piston ring for 1 minute at a current density of 60 A/dm³, the crack network of the previously deposited chromium layer is expanded and filled with diamond particles. This cycle, namely cathodic chromium plating for 10 min and anodic etching for 1 min, is repeated a total of 15 times, resulting in a hard chromium diamond particle layer with a thickness of about 120 μm. The crack density is about 125 cracks per mm.

The piston ring is then placed in an electrolyte with the same composition as above, but without diamond particles, and the piston ring is first cathodically operated and chromium-plated for 30 min at a current density of 60 A/dm². Then, the polarity is reversed and the crack network at the surface is expanded by anodically operating the piston ring at a current density of 60 A/dm². The crack density at the surface is 121 cracks per mm and the average width of the cracks is 4 μm.

To create a microscopic image of the surface, a polishing of the running surface of the piston ring is made. For this purpose, the piston ring is ground on the surface with SiC wet-grinding paper successively with the following grain sizes:
  Grain size 220
  Grain size 320
  Grain size 600
  Grain size 1200
  Grain size 4000

Polishing is performed with a 1 μm diamond suspension until the specimen is scratch-free and contour sharp.

Subsequently, a microscopic image of the surface of the tread is taken.

The invention claimed is:

1. A piston ring, comprising:
   a base body having an inner circumferential surface, a first flank surface, a second flank surface and an outer circumferential surface,
   a first chromium layer with a crack network applied to the outer circumferential surface,
   wherein the crack network of the first chromium layer has a crack density of 10-250 cracks per mm and solid particles having an average particle size of 0.01-10 μm are embedded in the cracks of the first chromium layer,
   a second chromium layer having a crack network applied on the first chromium layer,
   the crack density of the crack network of the second chromium layer being 10-250 cracks per mm, wherein no solid particles are embedded in the cracks of the second chromium layer, the cracks on the surface of the second chromium layer have an average width of 1-15 μm, the cracks on the surface of the second chromium layer are electrolytically expanded and the surface proportion of the cracks on the surface of the second chromium layer is 3-25%, based on a total surface of the second chromium layer.

2. The piston ring according to claim 1, wherein the average width of the cracks on the surface of the second chromium layer is 2-10 μm and the crack density of the second chromium layer is 30-200 cracks per mm.

3. The piston ring according to claim 2, wherein the surface proportion of the cracks on the surface of the second chromium layer is 5-20%.

4. The piston ring according to claim 3, wherein the thickness of the first chromium layer is 60-200 μm.

5. The piston ring according to claim 4, wherein the thickness of the second chromium layer is 5-150 μm.

6. The piston ring according to claim 5, wherein the diameter of the piston ring is 120-1000 mm.

7. The piston ring according to claim 6, wherein the solid particles comprise at least one of diamond, tungsten carbide, chromium carbide, alumina, silicon carbide, silicon nitride, boron carbide and/or cubic boron nitride.

8. The piston ring according to claim 1, wherein the surface proportion of the cracks on the surface of the second chromium layer is 5-20%.

9. The piston ring according to claim 1, wherein the thickness of the first chromium layer is 60-200 μm.

10. The piston ring according to claim 1, wherein the thickness of the second chromium layer is 5-150 μm.

11. The piston ring according to claim 1, wherein the diameter of the piston ring is 120-1000 mm.

12. The piston ring according to claim 1, wherein the solid particles comprise at least one of diamond, tungsten carbide, chromium carbide, alumina, silicon carbide, silicon nitride, boron carbide and/or cubic boron nitride.

13. The piston ring of claim 1, wherein the surface of the second chromium layer is an outermost surface of the piston ring.

14. A method of manufacturing a piston ring according to claim 1, comprising the steps of:

(a) a piston ring having the base body comprising the inner peripheral surface, the first flank surface, the second flank surface and the outer circumferential surface placed in the electrolyte containing a chromium compound and solid particles having an average particle size of 0.01-10 μm;

(b) providing the first hard chromium layer electrolytically deposited on the outer circumferential surface, where the first hard chromium layer has the crack network;

(c) reversing a direction of electric current, wherein the solid particles are deposited within cracks of the crack network that have expanded;

(d) repeating steps (b) and (c) at least once so that a first hard chromium layer is formed which contains solid particles in the cracks;

(e) placing the piston ring in an electrolyte containing a chromium compound and no solid particles, and the second hard chromium layer is electrolytically deposited on the first hard chromium layer, the second hard chromium layer having the crack network with the crack density of 10-250 cracks per mm; and (f) reversing the direction of electric current, wherein cracks formed on the surface of the second hard chromium layer expand to the average width of 1-15 μm and the surface proportion of the cracks is 3-25%, based on the entire surface of the second hard chromium layer.

15. An internal combustion engine comprising a piston ring according to claim 1.

16. The internal combustion engine of claim 15, wherein the internal combustion engine comprises a diesel engine.

* * * * *